Patented June 22, 1948

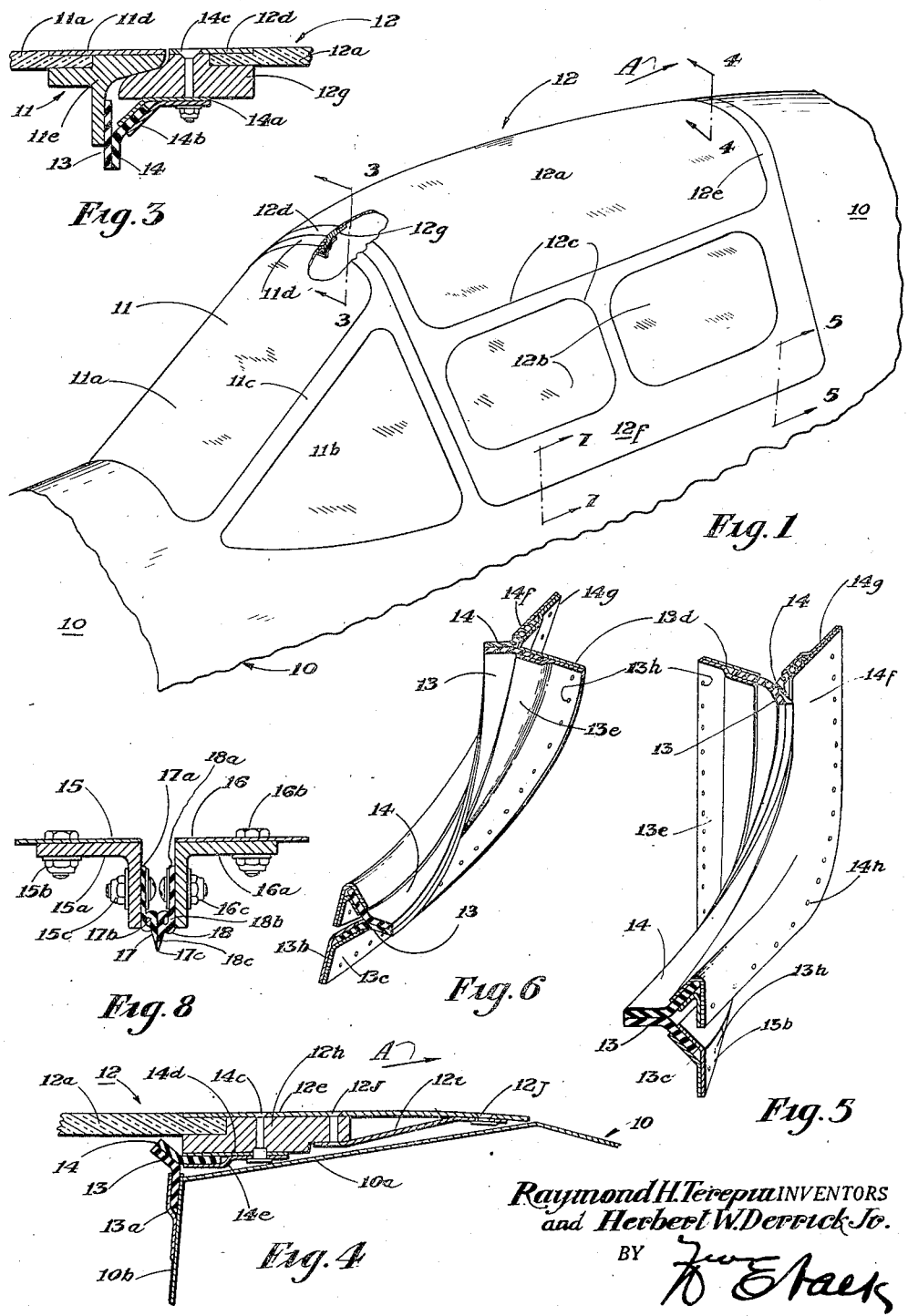

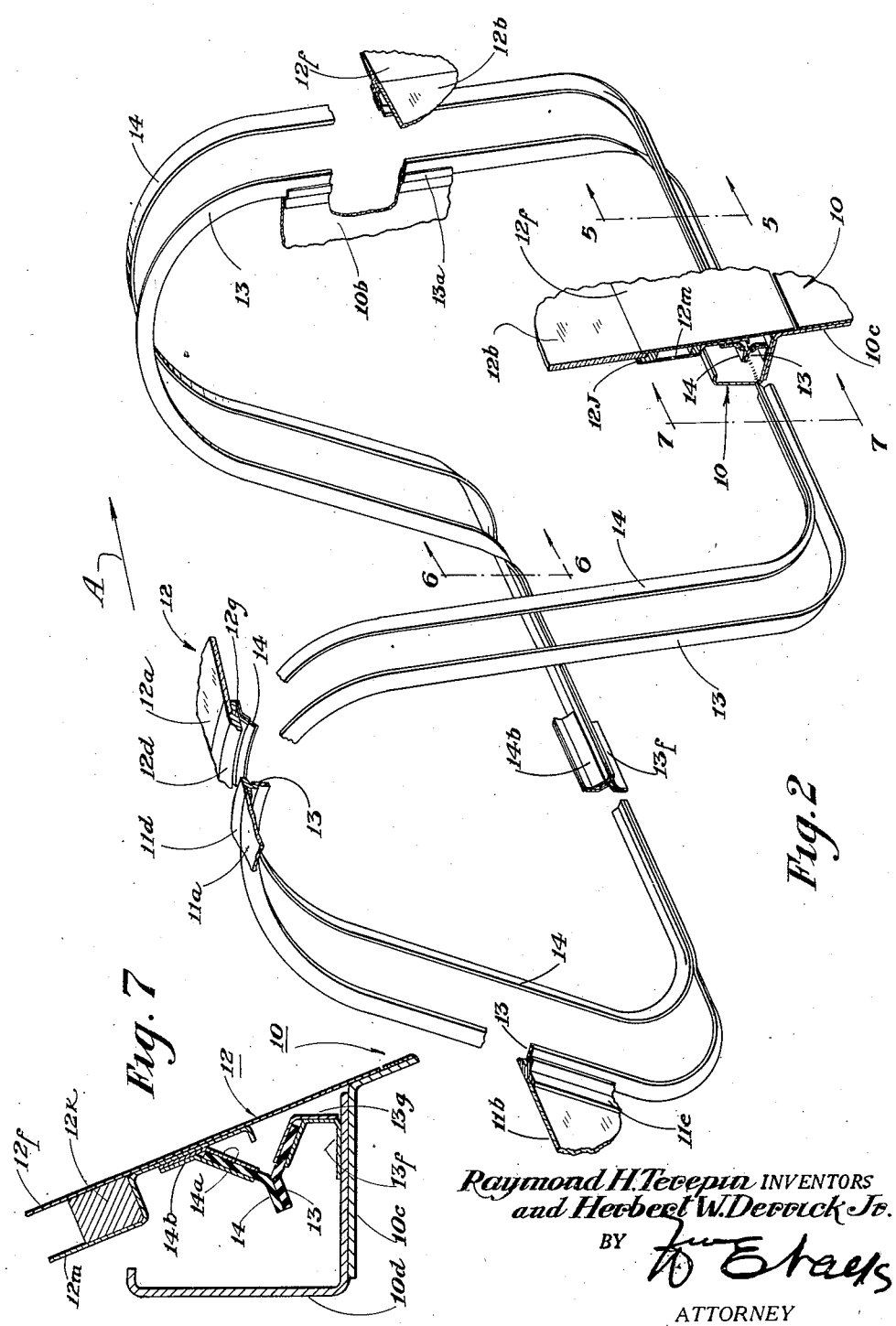

2,443,751

UNITED STATES PATENT OFFICE 2,443,751

PRESSURE SEAL FOR AIRCRAFT

Raymond Harry Terepin and Herbert William Derrick, Jr., Buffalo, N. Y., assignors to Curtiss-Wright Corporation, a corporation of Delaware Application June 1, 1944, Serial No. 538,240

14 Claims. (Cl. 244—121)

The present invention relates to pressure seals and more particularly to improvements in seals between relatively movable or slidable elements of pressurized aircraft.

The operation of aircraft at high altitude makes it desirable that the compartments and enclosures, such as the cabin or cockpit, be pressurized to a higher pressure corresponding to a lower altitude to alleviate the physical discomfort to the human occupants which they would otherwise be subjected to in this reduced pressure region. The sealing of cabins, sliding canopies, escape hatches and other closures against internal pressures has presented difficulties which have developed into major design problems. Various resilient seals have been employed such as sponge rubber, rubber tubular extrusions and the like, but the lowered resilience of these materials at the lower temperatures prevailing at high altitudes has materially affected the sealing qualities of most of the prior arrangements.

It is a major object of the present invention to provide pressure seals for the joints or gaps between aircraft openings and closures, and between relatively movable or slidable aircraft elements in which the differential pressure between the enclosure and the outside atmosphere at these higher altitudes, is utilized. It is a further object to utilize this pressure differential to assist in the sealing by permitting the use of a flexible rubber seal in these arrangements, wherein the lowered resilience of the flexible material would normally be a major factor and a deterrent to its use.

It is an important object of the present invention to provide a simple and effective seal which can be readily constructed and installed along the edges of the openings for the closure elements of aircraft and particularly along such edges which are irregular in shape and direction. It is a further object to provide such a seal which is adapted to be installed in single or continuous strips in which it is necessary to twist the same from one plane to another throughout its length to follow the conformation of the opening or the closure element. It is a further object of the present invention to provide a seal in which the sliding friction developed between the sealing elements is reduced to a minimum.

Other objects and advantages of the present invention may become obvious to those skilled in the art after reading the present description together with the accompanying drawings, in which:

Fig. 1 is a perspective view of a sliding aircraft canopy to which the present invention is applicable;

Fig. 2 is a similar perspective view of the sealing elements in their installed relationship showing fragmentary portions of the airplane and sliding closure;

Fig. 3 is a detailed cross section taken along the front edge of the canopy along the lines 3—3 of Fig. 1;

Fig. 4 is a detailed cross section taken at the rear of the canopy taken along the lines 4—4 of Fig. 1;

Fig. 5 is a detailed perspective view of a portion of the sealed joint as taken along the line 5—5 of Figs. 1 and 2;

Fig. 6 is a similar detailed view taken along the lines 6—6 of Fig. 2;

Fig. 7 is a detailed cross section looking rearwardly taken along the lines 7—7 of Fig. 2; and Fig. 8 is a detail cross sectional view of a modified form of pressure seal.

Referring now to Fig. 1 there is shown a portion of the body of an aircraft 10 provided with a cockpit having a fixed windshield portion 11 and a movable canopy or enclosure 12. It will be understood that the movable canopy shown in the drawings has been selected for illustrative purposes only and that the seal arrangements of the present invention are not to be restricted thereto, but are applicable to numerous other arrangements where pressure seals are desirable. The windshield portion 11 is preferably provided with transparent glass, Plexiglas, or other plastic panels 11a and 11b suitably supported within the windshield framework 11c and 11d. The movable canopy 12 is similarly provided with transparent panels or lights 12a and 12b supported within the forward transverse frame member 12d, the rear member 12e, the intermediate frame or cam members 12c and the longitudinal edge members 12f.

As may be seen from Fig. 2 the canopy 12 is of a conventional transversely arched cross section in the form of an inverted U or V having upwardly converging side portions and a semicircular or rounded top portion. This figure shows two continuous strip seal elements 13 and 14 attached respectively to the fixed portions of the airplane body 10 and to the movable canopy portion 12. Obviously each strip could be made in a number of butted sections but normally with our improved construction it will be desirable to use the longest strips possible with a minimum number of abutting or end joints. Fig. 1 shows the canopy in its closed or forward position from which it is opened by rearward movement as indicated by the arrows A in Figs. 1, 2 and 4. Fig. 2 shows fragmentary portions of the fixed windshield, fuselage and canopy with the latter in its partially opened position for purposes of clarity.

The sealing elements 13 and 14 are preferably formed of rubber or other flexible composition material. In the modification shown in Figs. 1 to 7 inclusive, these sealing elements are in the form of elongated flat bands or strips, each being preferably of a single piece or continuous loop capable of being twisted or bent into the compound curved or irregular forms shown in Fig. 2. As will be noted from this and the following detail figures, the seal element 13 is twisted and bent to be attached along the periphery or edge of the fixed portion of the windshield and cockpit coaming and is preferably supported such that it extends toward and is met by the corresponding seal element 14 carried upon the movable canopy member 12. Each seal element is attached to its respective fixed or movable member such that substantially half of its width is fixedly supported from the member and the remaining portion of its width is unsupported and free to abut or slide against the opposing member and to be flexibly deflected thereby. The two unsupported portions which so abut or contact each other form coextending lip portions, the edge and back surfaces of which are exposed to the higher internal pressure within the cockpit or body and are thereby placed into more intimate sealing contact. At the same time the adjacent or opposed faces of the sealing members where they diverge beyond the contacting lip portions are subjected to the lower atmospheric pressure which tends to assist in pulling the lip portion outwardly, and as the result of what might be termed to toggle action, into more intimate sealing contact.

Referring now to Fig. 3 there is shown the sealed joint or gap between the windshield 11 and the front edge of the canopy 12. The windshield panel 11a is supported upon a frame support member 11e which is preferably an extrusion of general T-shape, recessed or rabbeted to receive the panel 11a and provided with a retaining frame strip 11d suitably attached thereto. The canopy 12 has a front frame element 12g into which the front panel 12a is similarly rabbeted and retained by the strip 12d. The continuous sealing element 13 is suitably attached to the stem of the T frame member 11e such that it extends at this point substantially normal to the plane of the outer surface of the panel 11a. The seal strip 14 is supported from the frame element 12g by an obtuse angled retaining strip 14a and a similar shaped strip 14b by means of the countersunk through-bolt 14c. The strip 14 is supported such that it is obliquely disposed with respect to the curved plane of the windshield 12, and while it is normally flat or straight across its width, as shown in the top forward joint in Fig. 2, its unsupported or lip portion is deflected as shown in Fig. 3.

Fig. 4 shows the joint at the rear of the cockpit canopy in its closed position and from which it may be opened by rearward movement in the direction of the arrow A. The fuselage 10 is provided with a sheet portion 10a and a transverse portion 10b to which the fixed seal strip 13 is substantially vertically supported by means of the retaining strip 13a. The rear of the canopy 12 comprises a frame extrusion element 12h suitably rabbeted to receive the transparent panel 12a retained by the marginal cover strip 12e. The trailing portion of this cover strip is reinforced by the inner sheet 12i attached to the frame 12h and the cover strip by means of the countersunk rivets 12j. The seal half 14 is supported from the canopy frame member by means of the retaining strips 14d and 14e and the removable countersunk bolts 14c. It will be noted that the seal member 13 at the rear joint is retained in a substantially vertical plane or normal to the adjacent aerodynamic or exterior surface and that the movable seal member 14 is supported such that it is normally substantially parallel to this exterior surface. Due to this relationship the unsupported or lip portions meet in the closed position of the canopy and due to the differential in pressures in favor of that within the cockpit they are brought into the intimate sealing contact as shown in Fig. 4.

Figs. 5 and 6 are taken through the lateral joints between the canopy and the side portions of the cockpit coaming adjacent the rear of the canopy in its closed position and in these figures the canopy and adjacent fuselage portions have both been omitted for purposes of clarity. These two sectional views are accordingly substantially opposite and symmetrical, being taken at the point at which the adjacent sealing elements 13 and 14 cross or make a change in direction from the upper portion in which they converge and contact each other in an outward direction, to the lower or horizontal portion in which they converge inwardly toward each other. By reference to the lower portions of these figures, which may accordingly be described together, the fixed seal element 13 is supported between the obtuse angled retaining strips 13b and 13c provided with suitable openings 13h by means of which they are attached to the adjacent fuselage structure. The retaining strips 13b and 13c are formed to guide the fixed seal half 13 from its lower outer position at the bottom upwardly and inwardly into a position in which it is inside of the movable seal 14, at which it is supported by the retaining strips 13d and 13e. The seal element 14 is similarly supported by the formed retaining strips 14f and 14g provided with suitable holes 14h.

Fig. 7 is a detailed cross sectional view of the sliding joint along the lateral horizontal juncture of the canopy and the cockpit coaming as taken along the lines 7—7 of Fig. 1 and as shown to a smaller scale in Fig. 2. The side skin sheet of the fuselage 10 is reinforced by an obtuse angle element 10c to which a second angle sheet 10d is fixedly attached to form a protective housing or duct about the sliding joint, being open at the top to the pressure within the cockpit. The fixed seal element 13 is supported from the fuselage elements 10c and 10d by the channel shaped retaining strip 13f and the angle strip 13g. The edge framing of the canopy is formed of the parallel elements 12j and 12k to which is attached the outer marginal sheet 12f and the inner formed sheets 12m. The movable seal member 14 is attached to the sheets 12f and 12m by means of the obtuse angled retaining strips 14a and 14b of substantially the same shape as described in connection with Fig. 3. It will be noted that the seal halves 13 and 14 are supported such that they each form angles of substantially 45 degrees with respect to the exterior surface, being therefore perpendicular to each other with their inwardly extending deflected lip portions lying in a plane which is substantially normal to the outside or exterior surface.

It will accordingly be noted that a relatively tight and positive seal is provided along all the irregular edges of the sliding canopy 12, this seal being foolproof and automatic in its operation in that the pilot merely moves the canopy to its closed position without the necessity of any further operation to provide the necessary air-tight joint. The seal contact is made and broken in abutting relationship at the forward and rearward transverse joints and the lateral or lower joints along the cockpit coaming are of the sliding or wiping type, the latter being always in contact including the opened position of the canopy. This is accomplished by a single continuous seal attached to each of the fixed and movable members, the flexibility of the unsupported or lip portions of the seal members permitting their shift or transition into reversed positions at the lateral edges adjacent the rear transverse corners. In the closed position of the canopy all adjacent lip portions of the fixed and movable seal members are in firm contact, in which one or both of the seal members are deflected and the higher internal pressure causes them to be pressed together into a tightly sealed joint. This is accomplished without the use of expensive extrusions, or a precision built cockpit construction and presents no slots or recesses to fill with dirt and require frequent cleaning.

Fig. 3 shows a modified form of seal in which the seal halves are formed or molded with a bulb or tubular portion provided with an interior opening. In this modification the fixed member may be referred to as the skin sheet 15 and its supporting angle 15a to which it is attached by the bolt 15b; and the movable member as the sheet 16 attached to the corresponding angle 16a by the bolt 16b. To the inwardly extending or parallel legs of the angles 15a and 16a the seal halves 17 and 18 are attached by the bolts 15c and 16c. Each of these seal halves is identical with the other except that they are arranged in an opposite or symmetrical manner and are formed such that the lip portion of each extends toward that of the other in the open position. The seal half 17 comprises a flat attachment portion 17a, an intermediate tubular portion 17b and a lip portion tapered to a feather edge 17c, and the half 18 is similarly composed of the portions 18a, 18b and 18c. It will accordingly be noted that as the movable assembly 16 is brought forward or slid along the margin of the assembly 15 the tubular portions 17b and 18b are deformed or slightly flattened by their contact and the two lip portions brought into intimate and sealing contact from the tubular portions inwardly to the converging feather edge.

Other forms and modifications of the present invention, both with respect to its general arrangement and the details of its respective parts, which may become apparent to those skilled in the art after reading the present specification are intended to be embraced within the scope and spirit of this invention as more particularly defined by the appended claims.

We claim:

1. A pressure seal for a movable cockpit canopy for a pressurized aircraft body, comprising a flat flexible element fixedly attached to the interior of said body at the outer margin of said element such that its inner unsupported margin extends angularly inwardly into said body, a like flexible element angularly supported along its outer margin from said movable canopy arranged such that it also extends inwardly into said body and angularly with respect to said fixed flexible element whereby in the closed position of said canopy the inner free margins of said flexible elements are brought into co-extending contact and flexibly deformed to provide a pressure seal which is assisted by the pressure differential across said joint.

2. In a pressurized aircraft cabin having an opening and a movable closure therefor, means for sealing the joint between said opening and said closure comprising a flexible member marginally attached to said aircraft adjacent said opening, a flexible member marginally attached to said closure, said flexible members being relatively disposed such that their free extremities are directed toward each other and toward the interior of said aircraft whereby sealing of the joint is accomplished by closing movement of said closure and contact of said free extremities and the said contact is assisted by the greater pressure within said aircraft.

3. In a pressurized aircraft having a cabin, a cockpit opening for said cabin, and a sliding canopy for said cockpit opening, means for sealing the joint between the marginal edges of said canopy and said cockpit opening including an elongated flexible strip attached to the edge of said cockpit opening having an unsupported marginal edge extending angularly with respect to said canopy and extending inwardly with respect to said cabin in such manner that as said canopy moves into its closed position it contacts and deflects said free marginal edge to form a seal which is assisted by the increased differential in pressures existing between the interior of the cabin and the outside atmosphere.

4. Sealing means for a sliding aircraft cockpit canopy of the type set forth in claim 3 characterized by the said sealing means comprising; an attachment portion adapted to be supported from the edge of said cockpit opening; an intermediate tubular portion; and a tapered portion extending in an opposite direction from said tubular portion with respect to said attachment portion; said tubular and tapered portions adapted to be contacted by a marginal edge of said sliding canopy in its closed position to provide a seal between the edges of said canopy and said cockpit opening.

5. In combination with an aircraft having a pressurized cockpit therein, a sliding enclosure for said cockpit comprising a transversely arched section shiftable longitudinally back and forth between the closed position wherein it overlies the cockpit and forms a continuation of the aircraft outer surface and the open position in which it is in overlapped relation with respect to said fixed aircraft portion, means carried by said aircraft and said cockpit enclosure adapted to permit sliding thereof between its open and closed positions, and means for sealing the adjacent marginal edges of said cockpit opening and said sliding canopy comprising an elongated flexible strip attached to the margin of said opening being curvingly twisted as it extends from one marginal edge of said opening to another, and a like flexible strip attached to the marginal edges of said cockpit canopy such that in its closed position the inner deformable edges of said flexible strips meet in co-extending contact to provide a pressure seal which is assisted by the pressure differential existing between the inside and outside of said aircraft.

6. In an aircraft having a cockpit opening, an arched closure for said opening slidable longitudinally between open and closed positions, and a pair of cooperating elongated sealing elements of flexibly yieldable material attached to the marginal edges of said cockpit opening and said closure, respectively, said sealing elements having longitudinally-extending side sections and arched, transversely-extending end sections peripherally and opposedly disposed with respect to said opening and said closure, a side section of one of said elements being yieldably engageable with and being movable lengthwise along a corresponding side section of the opposed cooperating element as said closure is moved to a closed position and an arched end section of said first mentioned element being movable in a direction normal to its length to yieldably engage a corresponding end section of said opposed cooperating element arranged to form a continuous seal between said closure and the marginal edges of said cockpit opening.

7. In an aircraft having a cockpit opening, an arched closure for said opening slidable longitudinally between open and closed positions, and a pair of elongated, cooperating sealing strips of flexibly yieldable material attached to the marginal edges of said cockpit opening and said closure, respectively, said sealing strips having longitudinally-extending, side sections, arched, transversely-extending end sections and connecting twisted sections, said strips being marginally and opposedly disposed with respect to said opening and said closure, a side section of one of said strips being yieldably engageable and being movable lengthwise along a corresponding side section of the opposed cooperating strip as said closure is moved to a closed position and an arched end section of said first mentioned strip being movable in a direction normal to its length to yieldably engage a corresponding end section of said opposed cooperating strip arranged to form a continuous seal between said closure and the marginal edges of said cockpit opening.

8. In an aircraft having a cockpit opening, an arched closure for said opening slidable longitudinally between open and closed positions, and a pair of cooperating, elongated sealing elements of flexible material attached to the marginal edges of said cockpit opening and said closure, respectively, said sealing elements having similarly spaced longitudinally-extending side sections and arched transversely-extending end sections peripherally and opposedly disposed with respect to said opening and said closure, the side sections of one of said elements being yieldably engageable with and movable lengthwise along the corresponding side sections of the opposed cooperating element as said closure is moved to a closed position and the arched end sections of said first mentioned element being movable in a direction normal to their transverse disposition to yieldably engage the corresponding end sections of said opposed cooperating element arranged to form a continuous seal between said closure and the marginal edges of said cockpit opening.

9. In an aircraft having a pressurized cabin, a cockpit opening for said cabin, an arched closure for said opening slidable longitudinally between open and closed portions, and a pair of cooperating, elongated sealing strips attached to the marginal edges of said cockpit opening and said closure, respectively said strips having longitudinally-extending, similarly spaced side sections, arched, transversely extending end sections and connecting twisted sections, said strips being peripherally and opposedly disposed with respect to said opening and said closure, the side sections of one of said strips being engageable with and movable lengthwise along the corresponding side sections of the opposed cooperating strip as said closure is moved to a closed position and the arched end sections of said first mentioned strip being movable in a direction normal to their length to yieldably engage the corresponding end sections of said opposed cooperating strip, whereby to provide a continuous uninterrupted seal which is assisted by the differential pressure existing between the interior and exterior of said cabin.

10. In an aircraft having a cockpit opening, an arched closure for said opening slidable longitudinally between open and closed positions, and a pair of cooperating, elongated sealing strips of flexible material attached to the marginal edges of said cockpit opening and said closure, respectively, said sealing strips having similarly spaced, longitudinally-extending side sections, arched, transversely-extending end sections and connecting, twisted corner sections, said sealing strips being peripherally and opposedly disposed with respect to said opening and said closure, the side sections of one of said strips being yieldably engageable with and movable lengthwise with respect to the corresponding side sections of the opposed cooperating strip as said closure is moved to a closed position and the arched end sections of said first mentioned strip being movable in a direction normal to their length to yieldably engage the corresponding end sections of said opposed cooperating strip arranged to form a continuous seal between said closure and the marginal edges of said cockpit opening.

11. In an aircraft having a cockpit opening, an arched closure for said cockpit opening slidable longitudinally between open and closed positions, and cooperating, elongated, flexible sealing strips attached to the marginal edges of said cockpit and said closure so that they have unsupported, angularly-extending marginal edges, said sealing strips having similarly-spaced, longitudinally-extending side sections, arched, transversely-extending end sections and connecting twisted corner sections, the unsupported edges of the side sections of one of said strips being yieldably engageable with and movable lengthwise over the unsupported edges of the corresponding side sections of the cooperating strip as said closure is moved to a closed position and the arched end sections of said first mentioned strip being movable in a direction normal to their length so that unsupported edges thereof yieldingly engage the unsupported edges of corresponding end sections of said cooperating strip.

12. In an aircraft having a cockpit opening, an arched closure for said cockpit opening slidable longitudinally between open and closed positions, and cooperating, elongated, flexible sealing strips attached to the marginal edges of said cockpit and said closure so that they have free, marginal edges, said sealing strips having similarly spaced, longitudinally-extending side sections, arched, transversely-extending end sections and connecting twisted corner sections, the free edges of the side sections of one of said strips being yieldably engageable with and movable lengthwise over the free edges of the corresponding side sections of the cooperating strip as said closure is moved to a closed position and the arched end sections of said first mentioned strip being movable in a direction normal to their length so that the free edges thereof yieldably engage the free edges of corresponding end sections of said cooperating strip, the free edges of said strips extending angularly with respect to one another and being engageable with one another throughout their entire length in the closed position of said closure and the free edge of one end section of one of said strips being reversed in position with respect to the free edge of the other end section.

13. In an aircraft having a pressurized cabin, a cockpit opening for said cabin, an arched closure for said cockpit opening slidable longitudinally between open and closed positions, and cooperating, elongated, flexible sealing strips attached to the marginal edges of said cockpit and said closure so that they have free marginal edges, said sealing strips having similarly spaced, longitudinally-extending side sections, arched, transversely-extending end sections and connecting twisted corner sections, the free edges of the side sections of one of said strips being yieldably engageable with and movable lengthwise over the free edges of the corresponding side sections of the cooperating strip as said closure is moved to a closed position and the arched end sections of said first mentioned strip being movable in a direction normal to their length so that the free edges thereof yieldably engage the free edges of corresponding end sections of said cooperating strip, the free edges of said strips extending angularly with respect to one another and being engageable with one another throughout their entire length in the closed position of said closure to provide a seal which is assisted by the differential pressure existing between the interior and exterior of said cabin and the free edge of one end section of one of said strips being reversed in position with respect to the free edge of the other end section.

14. In pressurized aircraft having a movable closure for an opening in the body of the aircraft, means for sealing the adjacent marginal edges of said body opening and said movable closure including an elongated flexible strip attached to the margin of said body opening, said strip being curvingly twisted as it extends from one marginal edge of said body opening to another, and a like flexible strip opposedly attached to the marginal edges of said movable closure in an angular disposition with respect to said first strip in the closed position of said closure in such manner that the inner deformable edges of both said flexible strips meet in co-extending contact to provide a pressure seal which is assisted by the pressure differential existing between the inside and outside of the aircraft.

RAYMOND HARRY TEREPIN.
HERBERT WILLIAM DERRICK, Jr.

REFERENCES CITED

The following references are of record in the file of this patent:

UNITED STATES PATENTS

| Number | Name | Date |
|---|---|---|
| 1,495,727 | Cookingham | May 27, 1924 |
| 1,646,743 | Bernard | Oct. 25, 1927 |
| 2,125,752 | Saulnier | Aug. 2, 1938 |
| 2,361,113 | Lobelle | Oct. 24, 1944 |
| 2,361,298 | Laddon | Oct. 24, 1944 |